United States Patent [19]

Trevelyan et al.

[11] Patent Number: 5,194,081
[45] Date of Patent: Mar. 16, 1993

[54] GLASS MELTING PROCESS

[75] Inventors: Robert E. Trevelyan, Lancashire; Peter J. Whitfield, Merseyside, both of United Kingdom

[73] Assignee: Pilkington plc, Merseyside, England

[21] Appl. No.: 758,250

[22] Filed: Sep. 11, 1991

Related U.S. Application Data

[63] Continuation of Ser. No. 536,750, Jun. 12, 1990, abandoned.

[30] Foreign Application Priority Data

Jun. 13, 1989 [GB] United Kingdom ............... 8913539

[51] Int. Cl.5 .................. C03B 5/183; C03B 5/185
[52] U.S. Cl. ............................ 65/29; 65/135; 65/136; 65/162
[58] Field of Search ............... 65/135, 136, 178, 162, 65/29; 373/27, 31, 36, 41

[56] References Cited

U.S. PATENT DOCUMENTS

| | | | |
|---|---|---|---|
| 3,676,099 | 7/1972 | Fultz | 65/162 |
| 3,954,433 | 5/1976 | Holler | 65/162 |
| 3,997,315 | 12/1976 | Rhodes et al. | 65/178 |
| 4,028,083 | 6/1977 | Patznick et al. | 65/162 |
| 4,424,071 | 1/1984 | Steitz et al. | 65/337 |
| 4,693,740 | 9/1987 | Noiret et al. | |
| 4,900,337 | 2/1990 | Zortea et al. | 65/135 |
| 4,929,266 | 5/1990 | Cozac et al. | 65/135 |
| 4,961,772 | 10/1990 | Daly | 65/347 |

FOREIGN PATENT DOCUMENTS

| | | |
|---|---|---|
| 20363/83 | 5/1984 | Australia . |
| 31751/84 | 12/1985 | Australia . |
| 74005/87 | 5/1991 | Australia . |
| 0304371 | 2/1989 | European Pat. Off. . |
| 3718276 | 12/1988 | Fed. Rep. of Germany . |
| 250536 | 4/1925 | United Kingdom . |
| 1121778 | 7/1968 | United Kingdom . |
| 1480935 | 7/1977 | United Kingdom . |

OTHER PUBLICATIONS

The Handbook of Glass Manufacture, Tooley, 1984, pp. 299-301 Ashlee Publishing Co., N.Y.
"Glass Furnaces Design Construction and Operation," Wolfgang Trier, translated by Loewenstein (Society of Glass Technology, Sheffield, 1987) pp. 156,157.
"Electric Melting of Glass," Jaroslav Stanek, Glass Science and Technology, 1 (Elsevier Scientific Publishing Company, 1977) pp. 184-185, 188-189.

Primary Examiner—Joye L. Woodard
Attorney, Agent, or Firm—Burns, Doane, Swecker & Mathis

[57] ABSTRACT

A glass melting tank has a melting chamber, a shallow uniflow conditioning chamber, a shallow refining chamber between the melting chamber and a riser chamber. Heat is input to glass in the riser chamber by electrodes located centrally in the riser chamber near the base of the riser chamber. Temperature sensors sense the temperature entering the riser chamber through a throat and near the base of a downstream wall of the riser chamber and the heat input is controlled to produce torroidal flow in the riser chamber.

19 Claims, 4 Drawing Sheets

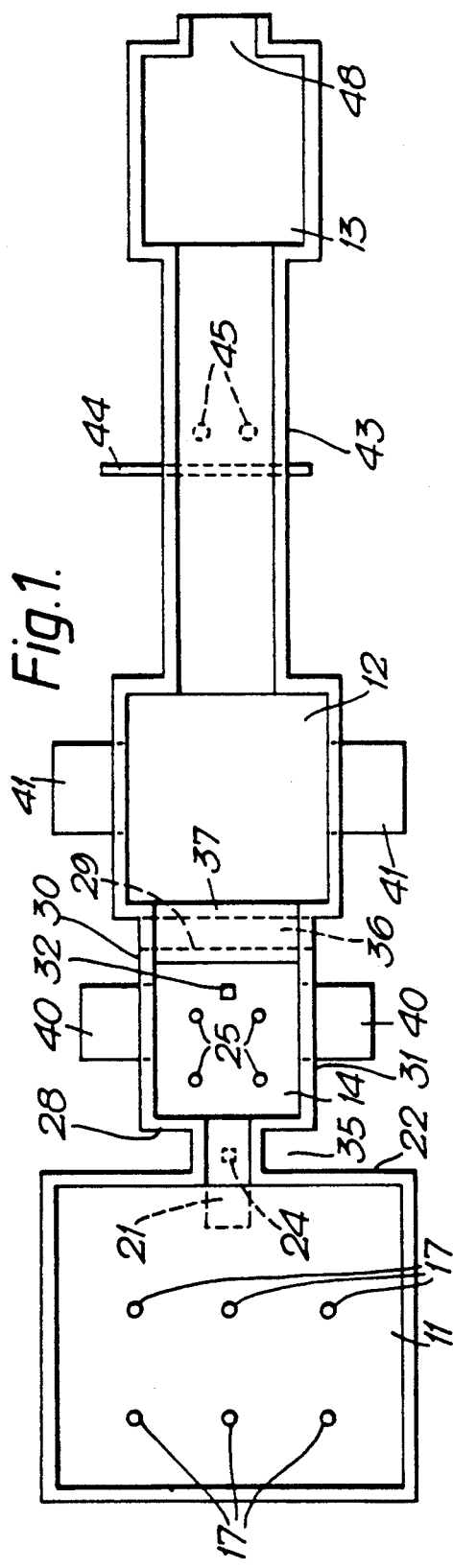
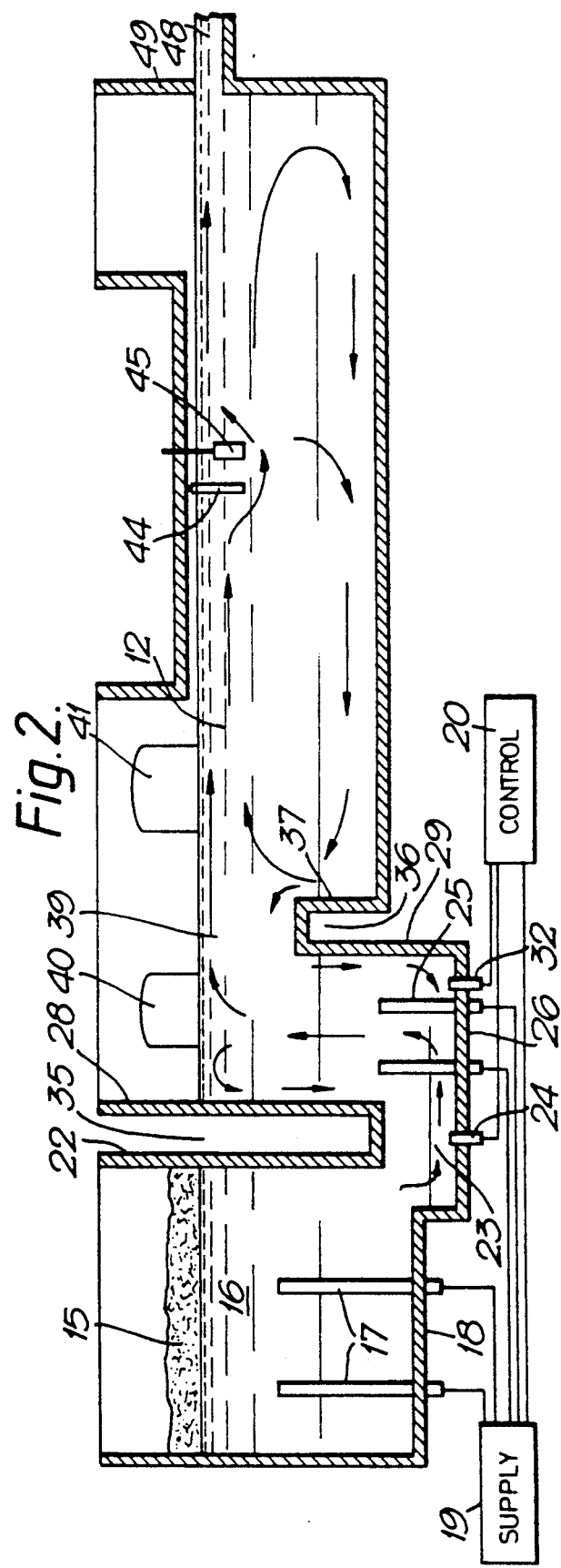

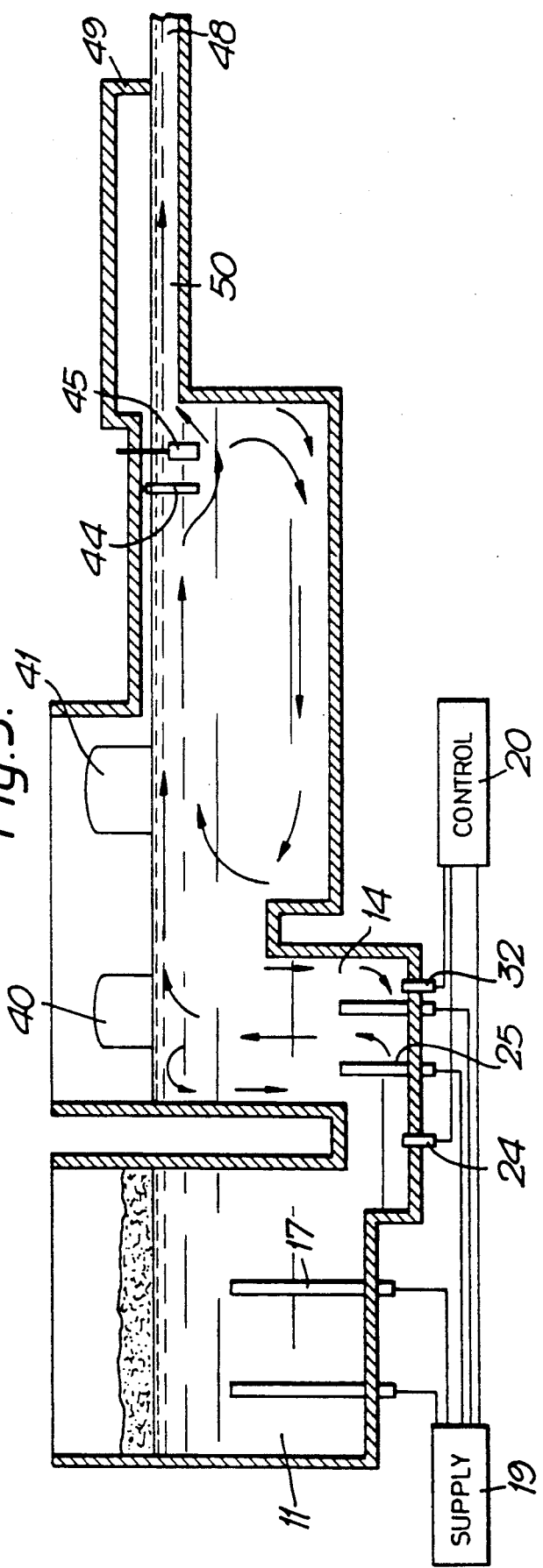

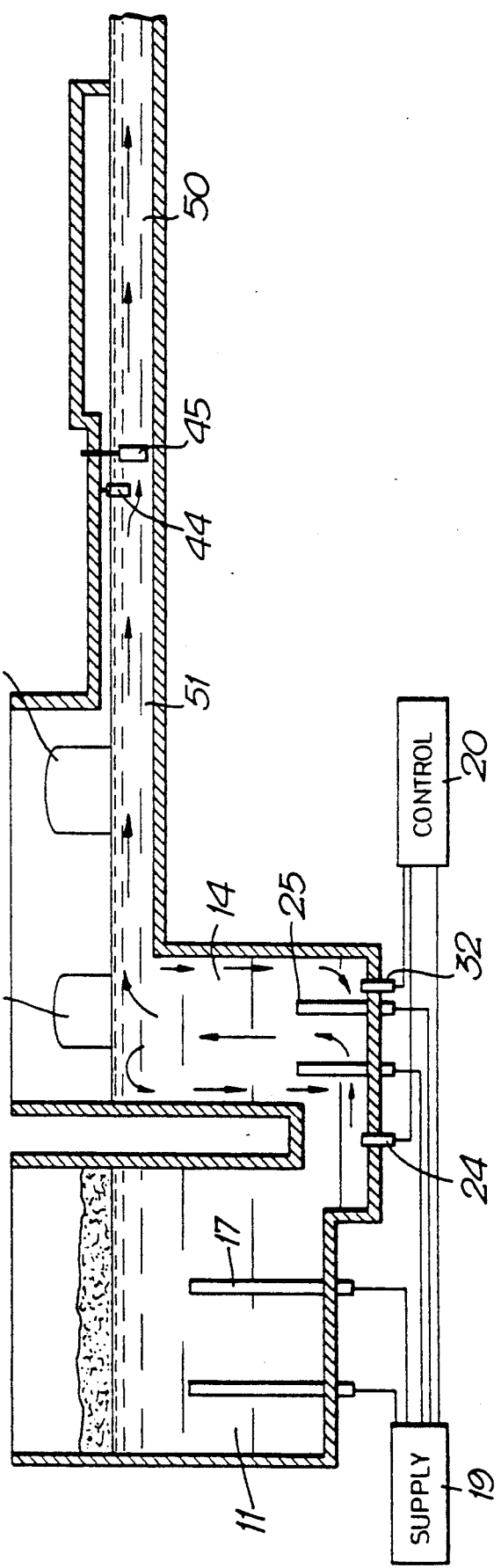

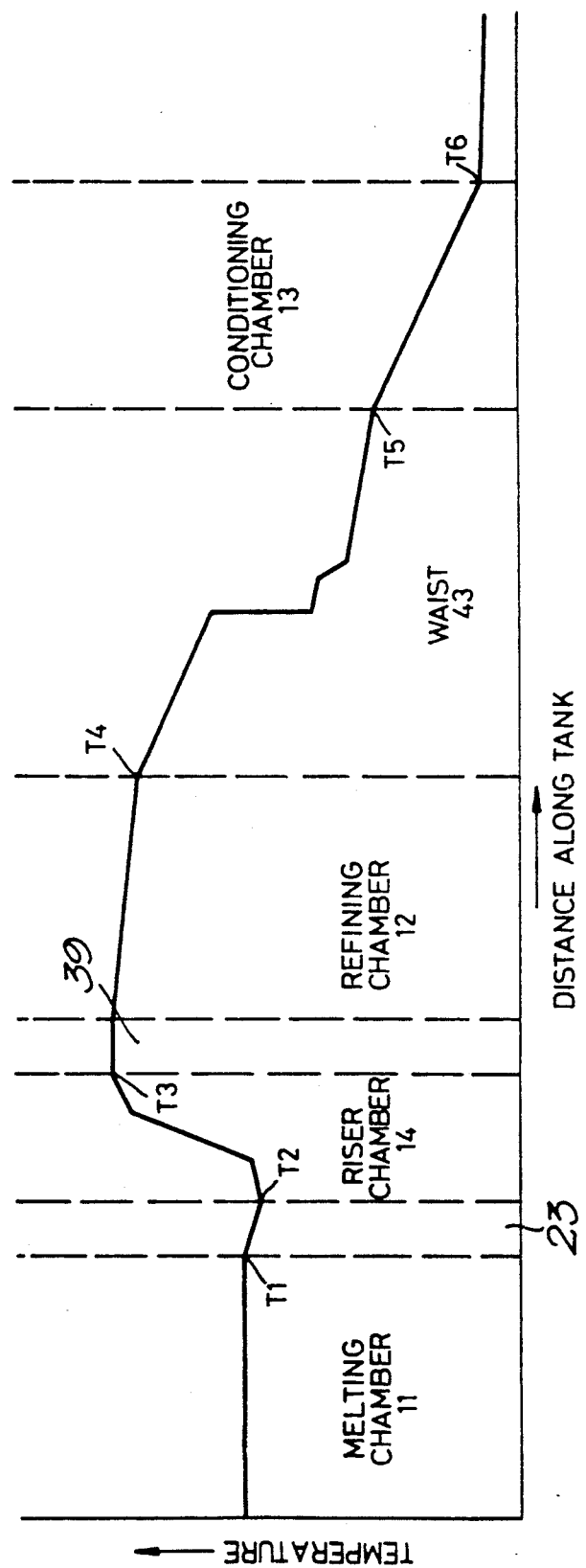

GLASS MELTING PROCESS

This application is a continuation of application Ser. No. 07/536,750, filed Jun. 12, 1990, now abandoned.

This invention relates to glass melting and is particularly directed to glass melting tanks using electric heating.

BACKGROUND OF THE INVENTION

It is well known for glass melting tanks to include a melting chamber in which solid batch material is heated to produce molten glass before entering a refining chamber in which the molten glass is at a sufficiently high temperature for refining to occur and thereby reduce defects due to impurities or bubble in the glass. Commonly the glass passes from a refining chamber through a conditioning zone in which thermal conditioning by controlled cooling is effected prior to glass leaving the tank through an outlet to a forming process. Such tanks may be used for continuous production of molten glass and are particularly applicable to the production of high quality glass for use in the production of flat glass.

When solely electric heating is used in a melting chamber of such a tank it is normal for the molten glass in the melting chamber to be covered by a cold top of solid batch material which is progressively melted by heat from electrodes immersed in the glass in the melting chamber. The flow path for molten glass from the melting chamber to a refining chamber, when using electric melting may be through a throat located adjacent the base of the melting chamber in order to reduce the probability of unmelted batch material being carried with the molten glass into the refining zone.

It is common in flame fired furnaces for the molten glass in a refining chamber to be sufficiently deep to permit recirculation of molten glass in convective flows so that the upper layers of glass in the refining zone are flowing towards a downstream end of the zone with a return flow in the lower region of the refining chamber.

It is known to provide a riser chamber after the melting chamber. It is also known to provide heating in such a riser chamber. However, serious problems can arise from unwanted corrosion of refractory walls of the riser chamber by the upward flowing glass, particularly where the riser chamber is increasing the temperature of the molten glass to a suitable refining temperature above that of the glass entering from the melting chamber, such as may be necessary in the production of high quality flat glass.

It is also known, for example from FIGS. 1 and 2 of U.S. Pat. No. 4,900,337, to use electrodes in a riser chamber forming a conditioning chamber following a throat from a melting chamber. However conditioning involves controlled cooling where electrodes are used to control the rate of loss of temperature of the molten glass rather than raising the temperature above that of the glass leaving the melting chamber. Where the temperature is not raised after passing through the throat into the riser the problems of corrosion in the riser are less severe due to the lower temperatures employed. Such arrangements where the glass temperature is not increased after leaving the melting chamber are more suitable for making glass for containers or fibre glass but may not provide the necessary refining for high quality flat glass production such as that used for a float glass production line.

SUMMARY OF THE INVENTION

It is an object of the present invention to provide an improved glass melting tank and an improved method of melting glass which reduces the problem of corrosion in a riser chamber, where glass temperature is increased after leaving a melting chamber. Such arrangements may be used for the production of high quality flat glass.

The present invention provides a method of forming molten glass in a glass melting tank having a melting chamber, a riser chamber with walls and a bottom, a refining chamber and a conditioning chamber connected to an outlet from the glass melting tank. In accordance with that method, batch material is heated in the melting chamber to produce molten glass. The molten glass is passed from the melting chamber through a submerged throat to the bottom of the riser chamber which has an upstream wall adjacent the melting chamber, a downstream wall remote from the melting chamber and opposite the upstream wall, and two side walls connecting the bottom, the upstream wall and the downstream wall. The molten glass is heated in the riser chamber in a central zone spaced from the walls of the riser chamber, and both the upstream and downstream walls of the riser chamber are cooled, whereby an inhomogeneous temperature distribution is formed in the molten glass across the riser chamber and molten glass is caused to flow upwardly in the central zone of the riser chamber with downward glass flow adjacent the walls of the riser chamber. The heat input is such as to raise the temperature of the molten glass in the riser chamber and to maintain a molten glass temperature at the bottom of the riser chamber downstream of the heated central zone which is above the temperature of molten glass entering the riser chamber through the throat, thereby avoiding a build-up of cold molten glass at the bottom of the riser chamber. After leaving the riser chamber the molten glass is passed to the refining chamber, and then from the refining chamber to the conditioning chamber, where the molten glass is brought to a desired thermal condition prior to flowing continuously through the outlet from the glass melting tank.

Preferably the flow through the riser chamber is toroidal with upward flow in the centre of the toroid and downward flow around the outside of the toroid.

Preferably the method includes sensing the temperature of glass in said throat and sensing the temperature of glass adjacent the base of the riser chamber opposite said throat.

Preferably the method includes cooling upstream and downstream walls of said riser chamber.

Preferably heat is applied to glass in the riser chamber by a plurality of electrodes projecting upwardly from the base of the riser chamber.

Preferably the depth of molten glass in the riser chamber is at least twice the height of the electrodes in the riser chamber.

BRIEF DESCRIPTION OF THE DRAWINGS

FIG. 1 is a plan view of a glass melting tank in accordance with the present invention, FIG. 2 is a vertical section through the glass melting tank of FIG. 1, FIG. 3 is a view similar to FIG. 2 of a different embodiment of the invention, and FIG. 4 is a view similar to FIG. 2 of yet another embodiment of the invention, and FIG. 5 is a graph showing temperature variation of forward flowing glass along the length of the tank shown in FIGS. 1 and 2.

DESCRIPTION OF THE PREFERRED EMBODIMENTS

In this example the glass melting tank comprises a melting chamber 11, a refining chamber 12 and a conditioning chamber 13. A riser chamber 14 is located between the melting chamber 11 and the refining chamber 12. The tank is suitable for use in producing high quality flat glass such as float glass.

In use solid batch material for producing glass is supplied through a system such as a hopper system to the top of the melting chamber 11 so that a blanket of solid batch material 15 lies on top of molten glass 16 in the melting chamber. Heat is supplied to the melting chamber 16 by an array of electrodes 17 which are mounted on the base 18 of the melting chamber and project vertically upwards so as to be immersed in the molten glass 16. An electrical supply 19 is connected to the electrode and controlled by a control unit 20. Molten glass flows out of the melting chamber 11 through a centrally located exit 21 in the base 18 of the melting chamber adjacent a downstream wall 22 of the melting chamber. The exit 21 leads to a submerged throat 23 leading centrally into the lower part of the riser chamber 14. A thermocouple 24 is mounted in the base of the throat 23 so as to detect the temperature of molten glass in the throat 23. The thermocouple 24 is connected to the control unit 20.

The riser chamber 14 is provided with an array of electrodes 25 which are mounted on a base 26 of the riser chamber and project vertically upwards so as to be immersed in the molten glass in the riser chamber. The electrodes 25 are arranged to increase the temperature of forward flowing glass so that on leaving the riser 14 the forward flowing glass is at a suitable refining temperature higher than the temperature of the glass entering through the throat 23. The electrodes 25 are located in a central zone of the riser chamber 14 and are spaced from all four walls (upstream wall 28, downstream wall 29 and opposite side walls 30 and 31 of the riser chamber). In this way no heat is supplied to the molten glass in the riser chamber in the region of any of the walls of the chamber. The electrodes 25 are connected to the power supply 19 and, like the electrodes 17, are arranged to heat the molten glass by the Joule effect. A thermocouple 32 is mounted in the base 26 of the riser chamber close to the downstream wall 29 opposite the throat 23 so as to detect the temperature of molten glass at the bottom of the riser chamber in the region close to the downstream wall 29. The thermocouple 32 is coupled to the control unit 20 so as to control the power supplied to the electrodes 25 in dependence on the temperature detected by the thermocouples 24 and 32. The control 20 provides control of the power supplied to the electrode 25 in the riser chamber 14 independently of the control of the power supplied to the electrode 17 in the melting zone 16. The walls of each chamber in the melting tank are formed of refractory material so as to withstand the molten glass in the tank. The arrangement in the riser chamber 14 is however arranged to minimise corrosion effects from glass passing through the riser chamber from the melting tank chamber 16 to the refining chamber 12. The upstream wall 28 of the riser chamber is spaced from wall 22 of the melting chamber so as to provide an air space 35 which acts as a cooling means for the upstream wall 28 of the riser chamber. Similarly the downstream wall 29 of the riser chamber is separated by an air space 36 from the upstream wall 37 of the refining chamber 12. This air space 36 acts as a cooling means to cool the downstream wall 29 of the riser chamber. The two side walls 30 and 31 of the riser chamber are not facing heated chambers such as the melting and refining chambers and thereby permit sufficient cooling of the sides of the riser chamber. By arranging for the air spaces 35 and 36 to cool the upstream and downstream walls of the riser chamber and by locating the electrodes 25 so that the heat input in the riser chamber is confined to a central region well spaced from the side walls of the riser chamber, convective flows are formed in the glass passing through the riser chamber as shown in FIG. 2. The result is a toroidal flow pattern in which glass in the central region of the riser chamber is caused to flow upwardly surrounded by an annular pattern of downwardly flowing glass adjacent the walls of the riser chamber. In this way, glass entering the riser chamber through the throat 23 may rise in the central flow together with recirculated glass which has descended adjacent the walls of the riser chamber and then ascends in the central upward flow path. The glass which rises in the central region is then divided so that some passes over a weir 39 leading into the refining chamber 12 whereas the remainder is recirculated within the riser chamber in the toroidal pattern. By use of this system, the glass which flows forwardly over the weir 39 into the refining chamber has risen through the riser chamber out of contact with the refractory walls of the chamber and therefore has a much reduced likelihood of contamination from corrosion with the side walls. The glass which flows downwardly against the side walls is cooled by virtue of the cooling effect of the air spaces 35 and 36 thereby reducing the likelihood of corrosion with the side walls and any contamination which does result may be reduced as the glass rerises in the hotter central flow as it is recirculated upwardly through the riser chamber. The thermocouples 24 and 32 are operable to control the heat input from the electrodes 25 so as to ensure that there is no build-up of cold glass at the bottom of the riser chamber, particularly starting adjacent the downstream wall 29. Any such build-up of colder glass could gradually restrict the throat 23 causing the forward flowing glass to have a higher velocity on entering the riser chamber and thereby increasing the likelihood of corrosion at the foot of the wall 28 on entering the riser chamber. To minimise corrosion in the riser chamber it is important to avoid glass which enters from the throat 23 rising immediately adjacent the wall 28. Due to the direction of flow through the glass melting tank as a whole the likelihood of corrosion in the riser chamber is greatest on the upstream and downstream walls 28 and 29 but this risk is reduced by the toroidal flow pattern where the cooler downward flowing glass engages these walls. The control effected via the thermocouple 32 is used to ensure that the temperature of molten glass near the base of the riser 14 adjacent the downstream wall 29 and opposite the throat 23 is always higher than the temperature of the glass passing the thermocouple 24 in the throat 23. To achieve the correct temperature distribution in the riser 14 the electrodes 25 are arranged to input heat in the lower part of the riser chamber 14. The height of the electrodes 25 is between 20% and 50%, preferably 30% and 40% of the depth of molten glass in the riser chamber 14. This provides sufficient heat input at the lower part of the riser chamber 14 to avoid a build up of cold glass at the bottom of the chamber 14. In a preferred arrangement, the electrodes 25 are spaced from the walls of the riser chamber 14 by a distance at least as great as the height of the electrodes 25. The lateral spacing between a pair of electrodes 25 may equal the sum of the width of the throat 23 and the height of the electrodes 25. The forward spacing between rows of the electrode 25 may be between 0.8 and 1.4 times the height of the electrodes 25. The ratio of the volume V of glass in the riser chamber 14 to the glass load L passing through the tank is preferably in the range 1.25 to 2.5 m$^3$hr/tonne. The electrical power required in the riser chamber 14 is typically in the range 40 to 60 kw/m$^3$. The power density for the molybdenum electrodes 25 is typically in the range 20 to 40 kw/dm$^3$ of immersed molybdenum electrodes.

After passing over the weir 39 into the refining chamber the molten glass is further heated so as to reduce contamination from impurities and also to release bubbles. The glass may recirculate as shown by the arrows in the chamber 12 so that the forward flowing glass is in the upper part of the refining chamber with a colder return flow at the bottom of the chamber. Additional heat is applied above the molten glass in the riser chamber 14 and refining chamber 12 by gas burners operating through ports such as those marked at 40 and 41.

The glass melting tank is formed with a waist 43 adjacent the junction between the refining chamber 12 and conditioning chamber 13.

A barrier in the form of a transverse water-cooled pipe 44 extends across the waist and is submerged in the upper forward flowing path of the molten glass. The pipe is water-cooled so as to reduce the temperature of glass entering the thermal conditioning zone 13 and reduces the rate of flow of hot glass out of the refining chamber 12 thereby ensuring that the glass is held for a sufficient time in the refining chamber 12 for satisfactory refining to occur. The effect of the water pipe 44 does cause some glass to flow downwardly at that point joining a return flow at the base of the refining chamber 12. An array of stirrers 45 which may also be water-cooled are located adjacent the water pipe 44 on the downstream side of the pipe. The pipe 44 and stirrers 45 may improve the temperature and homogeneity of the glass entering the conditioning zone 13. The zone 13 is not normally heated and the temperature of the glass is gradually reduced on flowing through the conditioning zone 13 towards an outlet 48 leading to a glass forming process. The outlet 48 is positioned in the upper part of a downstream wall 49 of the conditioning zone so that only forward flowing glass in the upper part of the conditioning zone 13 leaves through the outlet 48. The lower levels in the conditioning zone may be recirculated as a return flow at the lower part of the conditioning zone and passed back through the refining zone for further refinement before leaving through the outlet 48.

As explained above, the riser chamber 14 in this example is used to raise the temperature of forward flowing glass and is not used for controlled cooling. A graph showing the typical temperature pattern of forward flowing glass passing through the melting tank is shown in FIG. 5. The temperature T1 of glass leaving the melting chamber 23 may fall slightly on passing through the throat 23 and enter the riser chamber 14 at a temperature T2 insufficient for effective refining. The heat input in the riser chamber 14 exceeds the cooling effect so that the temperature T3 of glass leaving the riser chamber 14 over the weir 39 is at a suitable refining temperature higher than T2. On passing through the refining chamber 12 the forward flowing glass cools to temperature T4 but is always above T2 and sufficient to effect refining. On passing through the waist 43 the temperature drops to T5 and controlled cooling to an outlet temperature T6 is effected on passing through the conditioning chamber 13.

The invention is not limited to the details of the foregoing example.

In particular, the refining and conditioning zones of the unit may be designed to operate with various flow regimes in the molten glass.

Alternatives to the above example are shown in FIG. 3 and FIG. 4. FIG. 3 shows that the downstream conditioning zone 50 is much shallower than the refining zone 12. This creates a situation in which there is only forward flow in the glass beyond the waist 43. In this manner more efficient use can be made of the area available for conditioning e.g. to enable higher glass loading. The deeper refining zone 12 continues to operate with return flows in the glass generated by the cooling effects of the water-cooled barrier 44 and stirrers 45 in the waist and of the refiner end wall. The amount of return flow is reduced compared with the full depth refining and conditioning and this produces greater thermal efficiency.

FIG. 4 shows that the refining zone 51, waist 43 and conditioning zone 50 are all of a similar shallow depth to that illustrated by FIG. 3. Under these conditions, there is only forward flow present in the glass beyond the riser zone 14. This reduces the energy requirement by virtue of not having to reheat return flows. The waist section 43 retains a shallow water pipe 44 to impede the surface flow leaving the refining zone. The refining zone 51 can be heated either by above-glass burners 41 or by below glass electric heating or by a combination of the two methods.

It will further be understood that, if desired, molten glass could be fed to the riser chamber through a plurality of throats, for example from a plurality of melting chambers. Such throats may be through different walls of the riser chamber which need not be of rectangular form and could have a number of walls other than four. A plurality of riser chambers 14 may be provided each supplied by a respective throat. A plurality of risers may be used and may be connected to a common conditioning chamber.

We claim:

1. A method of forming molten glass in a glass melting tank comprising heating batch material in a melting chamber to produce molten glass, and supplying heat in a riser chamber that is provided downstream of the melting chamber and which riser chamber has walls and a bottom, wherein refining takes place in a refining chamber to reduce impurities and release bubbles, and conditioning then takes place by cooling in a conditioning chamber connected to an outlet from the glass melting tank, which method further comprises:

(a) passing the molten glass from the melting chamber through a throat outlet into the bottom of the riser chamber which is provided with an upstream cooling wall adjacent the outlet of the throat to the riser chamber, a downstream cooling wall remote from the melting chamber and facing said upstream cooling wall, and two side walls connecting the bottom, the upstream cooling wall, and the downstream cooling wall;

(b) flowing the molten glass through the riser chamber before entering the refining chamber, while inputting heat to the molten glass in the riser chamber, by use of electrodes located in a lower part of the riser chamber in a central zone spaced from said walls of the riser chamber, to raise the temperature of the forward flowing glass leaving the riser chamber to an elevated, maximum, temperature which is greater than the temperature of the forward flowing glass entering the riser chamber and which is suitable for refining;

(c) cooling both said upstream and downstream cooling walls of the riser chamber whereby an inhomogeneous temperature distribution is formed in the molten glass and an upward central flow of molten glass from said electrodes is caused in said central zone of the riser chamber, well spaced from said walls of the riser chamber, with a cooler downward outer glass flow adjacent the walls of the riser chamber, so that glass entering the riser chamber through the throat may rise in the central flow together with recirculated glass that has descended in the downward outer glass flow;

(d) effecting a first temperature detection of molten glass on the side of said central zone which is adjacent said downstream cooling wall at the bottom of the riser chamber downstream of the central zone, and effecting a second temperature detection of molten glass flowing into the riser chamber from the throat;

(e) controlling the heat input from the electrodes in the riser chamber in dependence on both said first and second temperature detections (i) to raise the temperature of the molten glass in the riser chamber to said elevated, maximum, temperature, and (ii) to maintain a molten glass temperature at the bottom of the riser chamber downstream of the said central zone which is above the temperature of molten glass entering the riser chamber through the throat, thereby preventing a build-up of cold molten glass at the bottom of the riser chamber; and (f) passing the molten glass after leaving the riser chamber to the refining chamber and then from the refining chamber to the conditioning chamber, where the molten glass is cooled to a desired thermal condition prior to flowing continuously through the outlet from the glass melting tank.

2. A method according to claim 1 in which the flow through the riser chamber defines a toroid with upward central flow and downward annular outer flow.

3. A method according to claim 1 further comprising cooling, in the refining chamber, the forward flowing glass from said elevated, maximum, temperature.

4. A method according to claim 1 in which the depth of molten glass in the riser chamber is at least twice the height of the electrodes in the riser chamber.

5. A method according to claim 1 further comprising impeding forward flow of glass from the refining chamber to the conditioning chamber by use of a cooling device located in the forward flow of glass.

6. A method according to claim 5 further comprising stirring forward flowing glass between the refining chamber and the conditioning chamber.

7. A method according to claim 1 wherein the ratio of the volume, V, of molten glass in the riser chamber to the molten glass load, L, passing through the glass melting tank is in the range 1.25-2.5 m$^3$ hr/tonne.

8. A method according to claim 1 wherein said step of cooling both said upstream and downstream cooling walls comprises permitting air from cooling spaces adjacent said upstream and downstream cooling walls to cool said upstream and downstream cooling walls.

9. A method according to claim 1 wherein the batch material heated in the melting chamber lies on top of molten glass in the melting chamber, and heat is supplied to the melting chamber by an array of electrodes mounted in a lower part of the melting chamber.

10. A method of passing glass through a melting tank, comprising:

passing molten glass through a riser chamber and over a weir into a refining chamber, the glass having flowed through a throat into a lower part of the riser chamber, which riser chamber has side walls, upstream and downstream cooling walls, a base and heating electrodes located in a central zone of the base so that the heat input is confined to a central region of the chamber;

detecting the temperature of the molten glass flowing into the riser chamber;

detecting the temperature of molten glass at the bottom of the riser chamber in the region close to the downstream cooling wall; and controlling the power supply to the electrodes in dependence on the detected temperature;

the cooling of the riser chamber walls, and the location of the electrodes causing glass in the central region of the riser chamber to flow upwardly surrounded by an annular pattern of downwardly flowing glass adjacent the walls of the riser chamber such that glass entering the riser chamber through the throat rises in the central flow together with recirculated glass which has descended adjacent the walls of the riser chamber;

the heat input from the electrodes maintaining a molten glass temperature at the bottom of the riser chamber downstream of said central zone which is above the temperature of molten glass entering the riser chamber through the throat, thereby ensuring that there is no build-up of cold glass at the bottom of the riser chamber which could restrict the throat; and the glass which rises in the central region of the riser chamber being divided so that some of the glass which rises in the central region out of contact with the walls of the riser chamber passes over the weir leading to a refining chamber.

11. A method according to claim 10 wherein said upstream and downstream cooling walls are cooled by permitting air from cooling spaces adjacent said upstream and downstream cooling walls to cool said upstream and downstream cooling walls.

12. The method according to claim 10 wherein the glass in the riser chamber is heated to produce an increasing temperature profile with a maximum glass temperature in the riser on exit from the riser.

13. In a method of forming molten glass in a glass melting tank having a throat and a riser chamber connected between a melting chamber and a refining chamber, the riser chamber having a bottom, an upstream throat wall through which the riser chamber is interconnected by the throat with the melting chamber, and a downstream wall, the method comprising:

(1) flowing glass through the riser chamber from the throat to said refining chamber;

(2) applying heat to glass in the riser chamber from a plurality of electrodes located in a central zone of the riser chamber extending upwardly from the bottom of the riser chamber;

(3) effecting a first temperature detection of molten glass flowing into the riser chamber;

(4) effecting a second temperature detection of molten glass adjacent the bottom of the riser chamber downstream of said central zone;

(5) controlling heat supplied by the electrodes in dependence on said first and second temperature detections to maintain a molten glass temperature at the bottom of the riser chamber downstream of said central zone which is above the temperature of molten glass entering the riser chamber through the throat; and (6) cooling said upstream throat wall and downstream wall of the riser chamber;

wherein the cooling of the riser chamber walls and the location of the electrodes causes an upward flow of molten glass in a central region of the riser chamber with an annular downward flow in the riser chamber surrounding said upward flow; and wherein the cooling of the riser chamber walls reduces corrosion of those walls by cooling said annular downward flow, and any contaminant which does result may be reduced as glass rerises in the hotter upward flow in said central region as it is recirculated upwardly through the riser chamber.

14. A method according to claim 13 wherein said throat wall and downstream cooling wall are cooled by permitting air from cooling spaces adjacent said throat wall and downstream cooling wall to cool said throat wall and downstream cooling wall.

15. The method according to claim 13 wherein the glass in the riser chamber is heated to produce an increasing temperature profile with a maximum glass temperature in the riser on exit from the riser.

16. A method of forming molten glass in a glass melting tank comprising heating batch material in a melting chamber to produce molten glass, and supplying heat in a riser chamber that is provided downstream of the melting chamber and which riser chamber has walls and a bottom, wherein refining takes place in a refining chamber to reduce impurities and release bubbles, and conditioning then takes place by cooling in a conditioning chamber connected to an outlet from the glass melting tank, which method further comprises:

(a) passing the molten glass from the melting chamber through a throat outlet into the bottom of the riser chamber which is provided with an upstream cooling wall adjacent the outlet of the throat to the riser chamber, a downstream cooling wall remote from the melting chamber and facing said upstream cooling wall, and two side walls connecting the bottom, the upstream cooling wall, and the downstream cooling wall;

(b) flowing the molten glass through the riser chamber before entering the refining chamber, while inputting heat to the molten glass in the riser chamber, by use of electrodes located in a lower part of the riser chamber in a central zone spaced from said walls of the riser chamber, to raise the temperature of the forward flowing glass leaving the riser chamber to a temperature which is greater than the temperature of the forward flowing glass entering the riser chamber;

(c) cooling both said upstream and downstream cooling walls of the riser chamber whereby an inhomogeneous temperature distribution is formed in the molten glass across the riser chamber and an upward central flow of molten glass from said electrodes is caused in said central zone of the riser chamber, well spaced from said walls of the riser chamber, with a cooler downward outer glass flow adjacent the walls of the riser chamber, so that glass entering the riser chamber through the throat may rise in the central flow together with recirculated glass that has descended in the downward outer glass flow;

(d) effecting a first temperature detection of molten glass on the downstream side of said central zone, and effecting a second temperature detection of molten glass flowing into the riser chamber;

(e) controlling the heat input from the electrodes in the riser chamber in dependence on both said first and second temperature detections(i) to raise the temperature of the molten glass in the riser chamber to said temperature which is greater than the temperature of the forward flowing glass entering the riser chamber, and (ii) to maintain a molten glass temperature at the bottom of the riser chamber downstream of the said central zone which is above the temperature of molten glass entering the riser chamber through the throat; and (f) passing the molten glass after leaving the riser chamber to the refining chamber and then from the refining chamber to the conditioning chamber, where the molten glass is cooled to a desired thermal condition prior to flowing continuously through the outlet from the glass melting tank.

17. A method according to claim 16 wherein said step of cooling both said upstream and downstream cooling walls comprises permitting air from cooling spaces adjacent said upstream and downstream cooling walls to cool said upstream and downstream cooling walls.

18. The method according to claim 16 wherein the glass in the riser chamber is heated to produce an increasing temperature profile with a maximum glass temperature in the riser on exit from the riser.

19. A method according to claim 16 wherein the batch material heated in the melting chamber lies on top of molten glass in the melting chamber and heat is supplied to the melting chamber by an array of electrodes mounted in a lower part of the melting chamber.

* * * * *